United States Patent [19]

Seymour

[11] 4,204,853

[45] May 27, 1980

[54] GLASS SHEET ALIGNMENT MEANS AND METHOD OF USING

[75] Inventor: Samuel L. Seymour, Oakmont, Pa.

[73] Assignee: PPG Industries, Inc., Pittsburgh, Pa.

[21] Appl. No.: 960,403

[22] Filed: Nov. 13, 1978

[51] Int. Cl.$^2$ ............................................. C03B 23/02
[52] U.S. Cl. .................................... 65/106; 65/104; 65/273; 65/289
[58] Field of Search ............... 65/103, 108, 106, 273, 65/275, 289

[56] References Cited

U.S. PATENT DOCUMENTS

| | | | |
|---|---|---|---|
| 2,442,242 | 5/1948 | Lewis | 65/104 UX |
| 3,148,968 | 9/1964 | Cypher | 65/106 |
| 3,223,501 | 12/1965 | Fredley | 65/25 A |
| 3,265,484 | 8/1966 | Ritter, Jr. | 65/104 |
| 3,332,759 | 7/1967 | McMaster et al. | 65/25 A |
| 3,425,818 | 2/1969 | Plumat | 65/182 |
| 3,468,645 | 9/1969 | McMaster et al. | 65/104 X |
| 3,485,616 | 12/1969 | Nitschke | 65/182 |
| 3,573,889 | 4/1971 | McMaster et al. | 65/104 X |
| 3,594,149 | 10/1968 | Pickavance et al. | 65/182 |
| 3,600,150 | 7/1968 | Rougeux | 65/268 |
| 3,676,098 | 7/1972 | Hall | 65/106 |
| 3,701,643 | 10/1972 | Frank | 65/62 |
| 3,713,799 | 1/1973 | McMaster | 65/273 |
| 3,82,547 | 8/1974 | Nixon | 198/127 R |
| 3,846,104 | 11/1974 | Seymour | 65/108 |
| 3,992,182 | 11/1976 | Frank | 65/163 |

Primary Examiner—Arthur D. Kellogg
Attorney, Agent, or Firm—Dennis G. Millman

[57] ABSTRACT

Glass sheets are brought into accurate alignment with bending means while horizontally disposed by urging the glass sheets into contact with a contoured line of abutment. Some embodiments permit simultaneous aligning of a plurality of glass sheets side-by-side.

34 Claims, 9 Drawing Figures

GLASS SHEET ALIGNMENT MEANS AND METHOD OF USING

BACKGROUND OF THE INVENTION

This invention relates to the aligning of glass sheets in a bending process wherein horizontally disposed glass sheets are conveyed through a heating furnace and then brought into a bending apparatus where they must be brought into accurate alignment with the shaping means. More particularly, this invention provides positive orientation of glass sheets in the longitudinal and lateral directions as well as angularly within the bending station itself and assures that such orientation is maintained until the glass sheets are engaged by the shaping means. The problem of aligning glass sheets is particularly acute when the glass sheets are conveyed on a gas support system and, therefore, another of the objects of the present invention is to provide improved alignment means for such a gas support system. Another problem dealt with by the invention is the aligning of a plurality of glass sheets side-by-side preparatory to being bent simultaneously. The invention is particularly pertinent to the production of bent automotive glazing.

Many arrangements for aligning glass sheets in bending apparatuses are known in the prior art. Perhaps the simplest arrangement is to cause conveyor rolls carrying the glass sheet to stop when the glass has progressed to a predetermined location within the bending apparatus. Other relatively simple means to locate glass sheets include peg-like stop means against which the glass sheets abut, such as in U.S. Pat. No. 3,573,889 to McMaster et al. and U.S. Pat. No. 3,676,098 to Hall. In U.S. Pat. No. 3,425,818 to Plumat, wires serve as lateral guides for glass sheets. In each of these above-described prior art arrangements there is no provision for correcting a misorientation of a glass sheet. Also, the force of a glass sheet striking a peg shaped stop can distort the adjacent marginal portions of the glass sheet or cause other damage to the glass sheet.

U.S. Pat. No. 3,600,150 to Rougeux discloses a complex aligning apparatus wherein reciprocated bars are advanced into abutment with all four sides of a rectangular sheet of glass. Such a large number of moving parts is preferably avoided. The reference arrangement also appears to entail a time delay in the bending process. Moreover, the aligning bars apparently must be withdrawn from the bending area before bending is initiated, and thereby fails to positively maintain the alignment until bending begins.

A number of patents disclose means for conveying irregularly-shaped glass sheets in fixed orientations through a heating furnace. These include U.S. Pat. No. 3,485,616 (Nitschke), U.S. Pat. No. 3,594,149 (Pickavance et al.), and U.S. Pat. No. 3,827,547 (Nixon). None of these patents, however, deal with the problem of bringing glass sheets into proper alignment in a bending apparatus, but are limited to conveying glass sheets through a furnace. Moreover, it is preferable that conveying means separate from the furnace conveying means be provided for carrying the glass sheets out of the furnace and into the bending apparatus so that the glass sheets may pass through the furnace at a relatively slow rate and then be brought into the bending apparatus at a relatively rapid rate.

Means for bringing glass sheets into proper alignment near the exit end of a furnace are shown in U.S. Pat. Nos. 3,701,643 and 3,992,182, both to R. G. Frank. After the glass sheets are aligned, however, they are released by the aligning means and conveyed into the bending apparatus, during which time they may become misaligned again. Similar arrangements, but in which the glass sheets are held in alignment until deposited in the bending station, are shown in U.S. Pat. No. 3,713,799 to McMaster and U.S. Pat. No. 3,846,104 to Seymour. The aligning devices in all four of these patents, but in particular the latter two, are very complex machines with many moving parts and would appear to require considerable reconstruction for each product change. Additionally, such arrangements do not appear to be adaptable to handling a plurality of sheets side by side without greatly increasing the complexity of the machinery further.

Accordingly, there has been a need for bringing glass sheets of any shape into an accurately predetermined position within a bending apparatus and to positively retain the glass sheet in that position until the bending means engage the glass sheet. It would be even more desirable if these requirements could be met while processing a plurality of glass sheets side-by-side and/or while the glass sheets are supported on a layer of gases.

SUMMARY OF THE INVENTION

In accordance with the present invention there is provided a stationary locator frame extending in a generally horizontal plane and contoured to receive the forward portion of a glass sheet being conveyed into a bending station. The portion of the locator frame within which the glass sheet is received is contoured to conform closely to the curvature of a substantial portion of the leading edge of the glass sheet. A continuous force is applied to the trailing edge of the glass sheet by means of a rotating roll so as to drive the glass sheet into the locator frame. The frictional force exerted by the rotating roll causes the glass sheet to align itself by seeking out an equilibrium position wherein the forward portion of the glass sheet conforms to and is firmly abutted against the locator frame. By driving the glass sheet from the rear edge, scuffing of the central vision area of the glass sheet is avoided. Other than the rotating aligning roll, the aligning means of the present invention advantageously involves no moving parts. The simple design of the locator frame makes it easy to fabricate and to replace when changing production to glass sheets of a different shape. Furthermore, the use of a locator frame may be readily adapted to the simultaneous side-by-side processing of a plurality of glass sheets through the heating, aligning, and bending processes simply by providing the locator frame with a plurality of contoured pockets within which the respective glass sheets may be received. Although the aligning arrangement of the present invention may be employed in connection with a wide variety of known techniques for conveying and bending glass sheets in a generally horizontal position, it is particularly advantageous for use with the type of glass support system known as a gas hearth wherein the glass sheets float on a layer of heated gases. This is because the present invention both establishes and maintains the longitudinal, lateral, and angular orientation of each glass sheet within the bending station until the glass sheet is engaged by the bending means.

DETAILED DESCRIPTION

The glass sheet aligning means of the present invention will be described in connection with three illustrative examples of glass sheet bending systems in order demonstrate the variety of ways in which the aligning arrangement may be employed. The first example is depicted in FIGS. 1 and 2, the second in FIGS. 3 and 4, and the third preferred embodiment in FIGS. 5 through 9.

Figure 1:
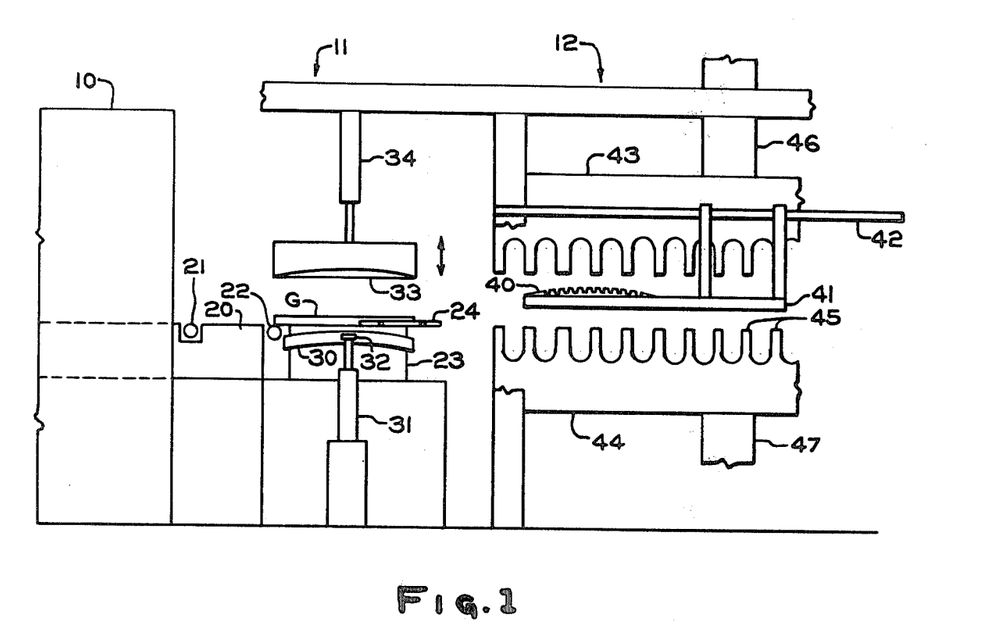
FIG. 1 is a schematic side view of the exit end of a furnace for heating glass sheets of the gas support type, a bending station employing the glass aligning means of the present invention, and a portion of a glass sheet tempering station.
Figure 2:
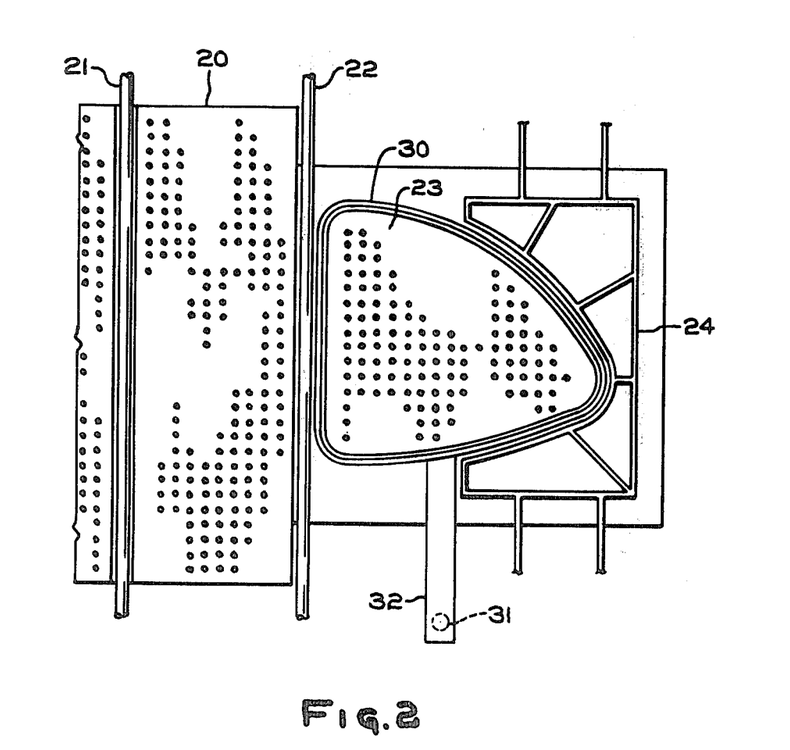
FIG. 2 is a plan view of the novel glass sheet aligning means of FIG. 1.

The bending apparatus depicted in FIGS. 1 and 2 is intended to schematically represent the type of systems disclosed in U.S. Pat. No. 3,713,799 to McMaster or U.S. Pat. No. 3,846,104 to Seymour, the disclosures of which are hereby incorporated by reference for their detailed description of the heating, bending and tempering means other than their aligning means. The chief characteristics of this type of bending arrangement are that the glass sheets are conveyed through the heating furnace 10 and into a bending station 11 on a layer of heated gases, whereupon they are lifted by an outline shaping ring 30 into contact with an upper vacuum shaping mold 33 where they are retained while the outline ring 30 is retracted and a tempering ring 40 is brought into alignment beneath the glass sheet. The tempering ring 40 receives the glass sheet from the upper vacuum mold and carries the glass sheet into a tempering station 12.

A hearth block 20, the last in a series of hearth blocks which extend through the furnace, extends from the exit of the furnace and includes a large number of orifices on its upper surface from which hot gases issue to support glass sheets out of contact with the hearth blocks. A take-out roll 21 accelerates each glass sheet emerging from the furnace so as to rapidly transfer it to the bending station 11. An aligning roll 22 also serves to rapidly convey the glass sheet onto another gas support hearth block 23 in the bending station and continues to urge the glass sheet forward to bring it into engagement with a locator frame 24.

The locator frame 24 presents a contoured line of abutment corresponding approximately to the outline of the leading portion of the glass sheet so that the glass sheet, when urged toward the locator frame, will be forced to shift into an orientation in which the line of abutment is fully engaged. In this position the glass is left with little or no freedom of movement. The locator frame is spaced from the aligning roll 22 a precisely determined distance so that the trailing edge of a fully abutted glass sheet G is approximately directly over the center of the aligning roll 22 as shown in FIG. 1. The aligning roll 22 continues rotating even after the glass contacts the frame fully so as to retain the glass sheet in the fully abutted, aligned position as the glass sheet floats on the layer of hot gases. The frictional force between the rotating aligning roll 22 and the glass sheet G is minimized and restricted to the trailing edge of the glass sheet in order to avoid scuffing the glass, but is sufficient to drive the floating glass sheet into the fully abutted position against the contoured line of abutment on the locator frame and to retain the glass sheet in that position. The locator frame shown in FIG. 2 is adapted to receive a single glass sheet but, as will become apparent hereinbelow, the locator frame arrangement of the present invention readily lends itself to processing a plurality of glass sheets side-by-side by providing a locator frame with a plurality of contoured lines of abutment against which a respective plurality of glass sheets may be received. The locator frame may be held in place by rigid attachment to any suitable nearby stationary structural element of the bending apparatus, and various specific embodiments for mounting the bending frame will be discussed in connection with the preferred embodiment below.

In selecting the portion of the outline of a particular shape of glass sheet to be engaged by the line of abutment, some general principles may be stated, but ultimately the determination will depend upon the particular overall shape. Basically, the line of abutment should describe an open-ended enclosure of less than 180° and should parallel a substantial portion of the perimeter of the glass sheet so as to establish a stable location for the glass sheet. The larger the angle through which the line of abutment sweeps, the more positive the aligning action, but an enclosure which circumscribes as little as about 60° or less of the glass sheet perimeter may be sufficient in some cases. More typically, about 90° to 120° of the glass sheet perimeter can be circumscribed conveniently and is preferred. If the glass sheets are provided with a generally trapezoidal shape having a short side and an opposite long side, it is usually advantageous to convey the glass sheets into the bending station with the narrow side forward. A triangularly shaped piece may be conveyed with an acute angle forward. When the glass shape lends itself, it is preferred to select an orientation whereby the trailing edge of the glass sheet is a relatively straight side and extends substantially parallel to the axis of the aligning roll. The line of abutment should have sufficient length to smoothly guide the glass sheet into the proper alignment and to distribute the contact force along a relatively long line. In most cases the best performance can be obtained with a length equal to at least 30 percent of the glass sheet perimeter. However, the line of abutment need not be continuous, but may have gaps in non-critical portions or may be used in combination with peg type stops, and in either case the line of abutment may be reduced in length. If a partial line of abutment is employed, it is preferred that the line (or lines) be located to engage side portions of the glass sheets.

When the glass sheet has become aligned in the bending station, it is lifted by a bending ring 30 which conforms to, but is slightly smaller than, the outline of the glass sheet. The bending ring 30 is raised vertically through a narrow space provided between hearth block 23 and locator frame 24, as well as between the hearth block 23 and aligning roll 22. A hydraulic cylinder 31 serves to vertically reciprocate the bending ring and is connected thereto by way of a horizontally extending arm 32. The glass sheet is lifted into contact with the underside of an upper vacuum mold 33, the surface of which includes a number of small orifices in communication with a source of vacuum. The upper vacuum mold 33 may be lowered by means of a hydraulic cylinder 34 at the same time that the bending ring 30 is raised so that the glass sheet is pressed therebetween to impart the desired curvature to the glass sheet. The glass sheet is then held by vacuum on the upper bending mold 33 when the bending ring 30 is lowered. The upper bending mold 33 may then be raised to permit a tempering ring 40 to enter the bending station and to be brought into alignment beneath the glass sheet. The tempering ring 40 conforms to the outline and contour of the marginal portions of the glass sheet. When the vacuum is released from the upper bending mold 33, the tempering ring 40 receives the glass sheet and conveys it horizontally out of the bending station and into the tempering station 12. The tempering ring 40 is supported on a cantilevered portion of a shuttle 41, which is adapted to be translated horizontally along guide rods 42. In the tempering station, the glass sheet is brought between upper and lower blast heads 43 and 44, respectively, which apply cooling blasts of tempering medium (usually air) through a plurality of nozzles 45 to rapidly cool the surface portions of the glass sheet and to thereby impart a temper to the glass. The air or other tempering medium is supplied to the upper and lower blast heads by means of ducts 46 and 47, respectively. After tempering is completed, the glass sheet may be conveyed on shuttle 41 to the right as shown in FIG. 1 to an unloading station where the glass sheet is removed from the tempering ring 40.

Figure 3:
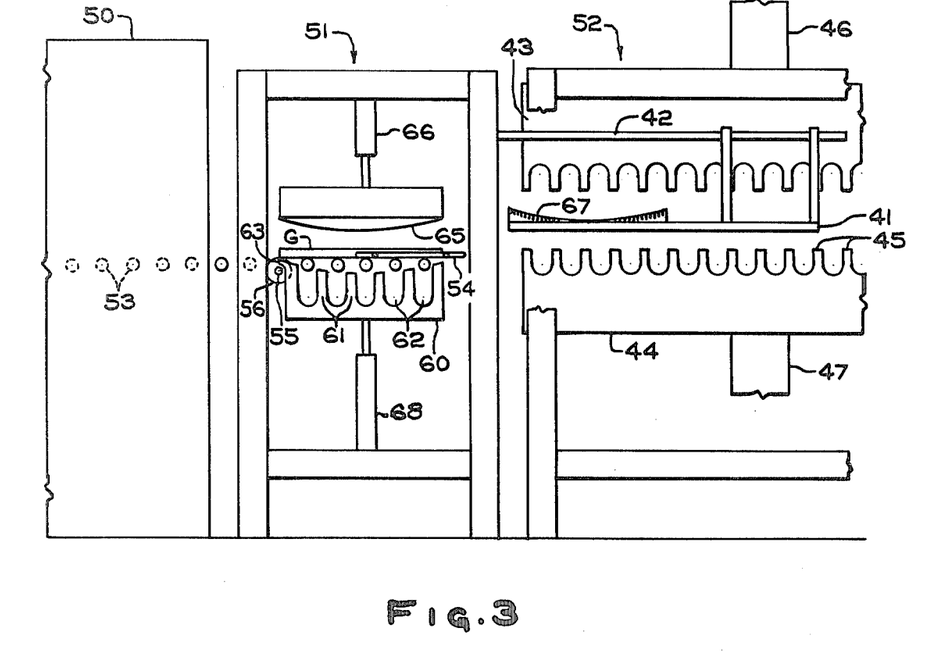
FIG. 3 is a schematic side view of a glass sheet heating furnace of the roller hearth type, a bending station incorporating the glass sheet aligning means of the present invention, and a portion of a glass sheet tempering station.
Figure 4:
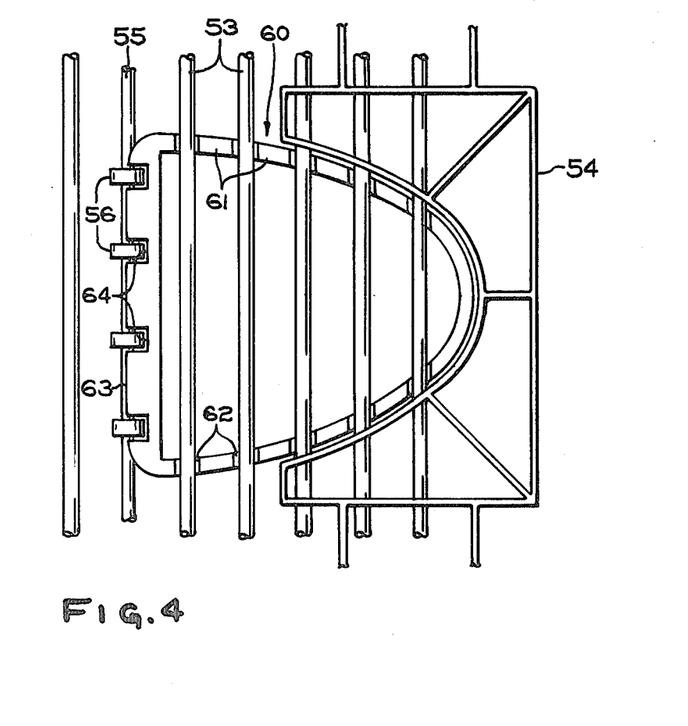
FIG. 4 is a plan view of the glass sheet aligning means of FIG. 3.

The alternate embodiment shown in FIGS. 3 and 4 differs from that of FIGS. 1 and 2 in that the glass sheets are conveyed by means of a roller conveyor rather than on a gas support bed. FIGS. 3 and 4 depict the type of glass sheet bending and tempering apparatus disclosed in U.S. Pat. No. 4,092,141 to Frank et al., the disclosure of which is hereby incorporated by reference. Other representative examples of this type of bending and tempering apparatus may be found in U.S. Pat. No. 3,507,639 to Seymour and U.S. Pat. No. 3,676,098 to Hall, the disclosures of which are hereby incorporated by reference. FIG. 3 schematically depicts a heating furnace 50, a bending station 51, and a tempering station 52. A roller conveyor 53 conveys sheets of glass in a horizontal orientation through the furnace 50 and into the bending station 51. The forward progress of each glass sheet is halted by a locator frame 54 which is constructed and operates in the same manner as the locator frame 24 described above in connection with the embodiments of FIGS. 1 and 2. The conveyor rolls 53 within the bending station may be driven separately from a locator roll 55, which is located beneath the trailing edge of a properly aligned sheet of glass engaged by the locator frame 54. Thus, when a sheet of glass comes into contact with or approaches the locator frame, driving of the conveyor rolls 53 in the bending zone may be halted so as to prevent scuffing of the underside of the glass sheet, while at the same time aligning roll 55 may continue to rotate in order to complete the urging of the glass sheet into its aligned position. The glass sheet is lifted from the conveyor rolls 53 by an outline bending ring 60 having raised portions 61 which contact the glass, and recesses 62 within which the rolls 53 are received. In order to permit the bending ring to support the trailing edge of the glass sheet as close as possible to the edge of the glass and at the same time to permit the aligning roll to act on the trailing edge of the glass sheet, it may be desirable to provide that portion of the bending ring with extending tab portions 63 with notches 64 therebetween as shown in FIG. 4. The aligning roll 55 may then be provided with a number of annular collars 56 of larger radius than the roll on which they are carried, each of which is aligned to be received within a respective one of the notches 64 in the bending ring. The glass sheet is lifted by the bending ring 60 into contact with the underside of an upper vacuum mold 65 as in the previous example. The bending ring 60 and the upper bending mold 65 may be vertically reciprocated by means of hydraulic cylinder means 66 and 68. The bent glass sheet is retained on the upper vacuum mold 65 when the bending ring 60 is withdrawn, and thereafter the glass is deposited on a tempering ring 67, which is conveyed into the bending station by horizontal shuttle means. The construction and operation of the shuttle means and the tempering station 52 are identical to those described above in connection with FIG. 1.

Figure 5:
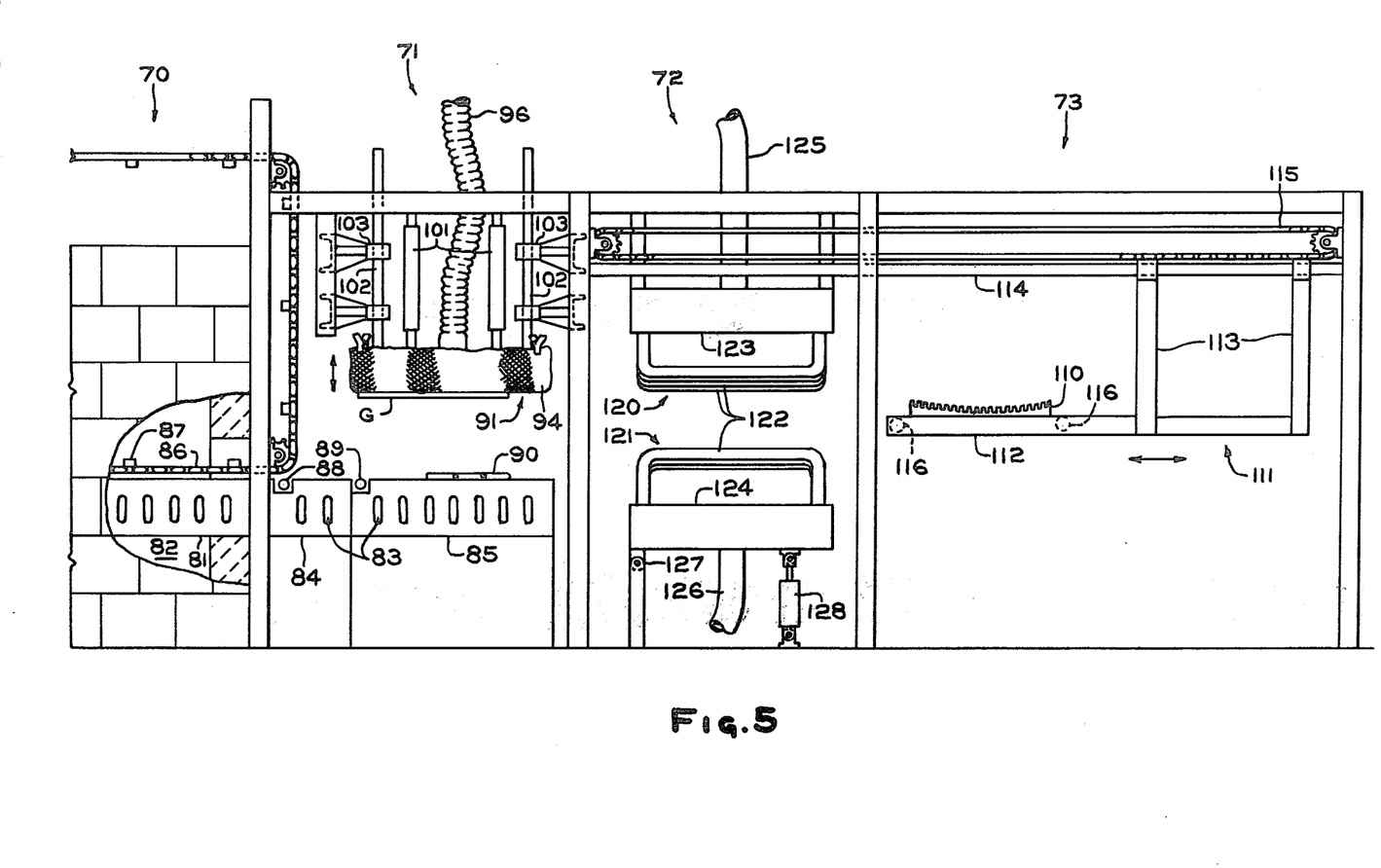
FIG. 5 is a side view of a specific preferred embodiment of a glass sheet heating, bending and tempering apparatus in which the novel glass sheet aligning means of the present invention may be incorporated to particular advantage.

In FIGS. 5 through 9 the aligning arrangement of the present invention is shown in conjunction with a preferred type of glass sheet bending arrangement which forms the subject matter of a copending patent application Ser. No. 960,404, filed on even data herewith by S. L. Seymour now abandoned. In FIG. 5 a side view of the preferred bending apparatus is shown wherein there is designated generally the exit end of a glass sheet heating furnace 70, a bending station 71, a tempering station 72, and an unloading station 73. The furnace tempering station and unloading station may be essentially the same as those shown in U.S. Pat. No. 3,846,104 (Seymour), the disclosure of which is hereby incorporated by reference. The furnace 70 is preferably of the gas support type wherein the sheets of glass are supported on a layer of hot gases as they are heated and conveyed through the furnace. Details of this so-called gas hearth type of furnace may be found in U.S. Pat. No. 3,223,501 to Fredley et al. and in U.S. Pat. No. 3,332,759 to McMaster et al. In the cut-away portion of the furnace in FIG. 5 it can be seen that the gas support bed is defined by a hearth block 81 through which a large number of vertical bores extend, some of which communicate the upper surface of the hearth block with hot, pressurized gases from a plenum chamber 82, and others of which communicate the top surface of the hearth block with cross-bored exhaust passages 83. The same hearth block construction continues beyond the furnace exit to an extension 84 and a support block 84 in the bending station. Greater detail of the hearth block construction may be found in the cross-sectional view of support block 85 in FIG. 7. There, it can be seen that vertical bores 99 extend completely through the block, and that bores 100 extend from the surface to the horizontally extending exhaust passages 83.

Referring again now to FIG. 5, there is shown one typical arrangement for moving the glass sheets through the furnace as they are supported on a film of hot gases. The conveying mechanism there comprises a pair of parallel, endless chains 86 flanking the path of the glass sheets within the furnace and joined by a plurality of pusher bars 87. At the exit of the furnace, each glass sheet may be released from the chain conveying means and driven at an accelerated speed across the extension block 84 and into the bending station by means of a take-out roll 88 and an aligning roll 89. Passage of the glass sheets from the furnace may be aided by providing the hearth blocks 81, 84, and 85 with a slight downward slope (e.g., 1° to 2°). Typically, sufficient gas pressure is maintained between the hearth blocks and the glass sheets so as to float the glass sheets about 1/16 inch (1.6 millimeters) above the upper surface of the hearth blocks. Take-out roll 32 and aligning roll 33 project above the upper surface of the hearth blocks just enough to make contact with the undersides of the glass sheets.

Figure 6:
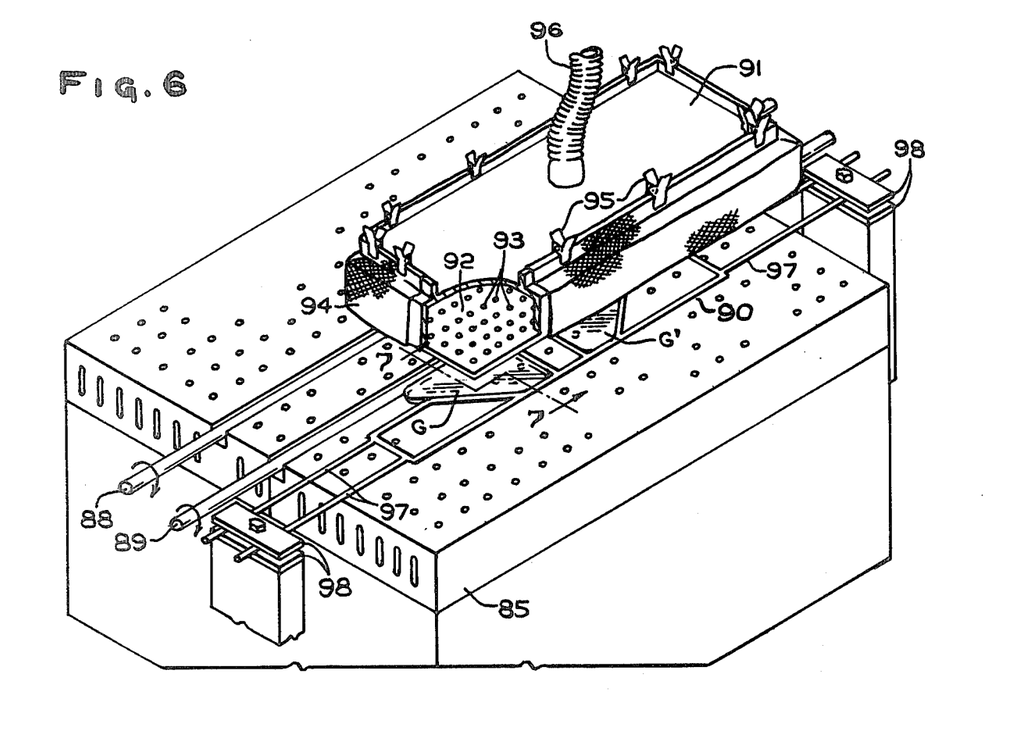
FIG. 6 is a perspective view of the bending station of the preferred embodiment of FIG. 5 showing the aligning means of the present invention adapted to simultaneously align two glass sheets.
Figure 7:
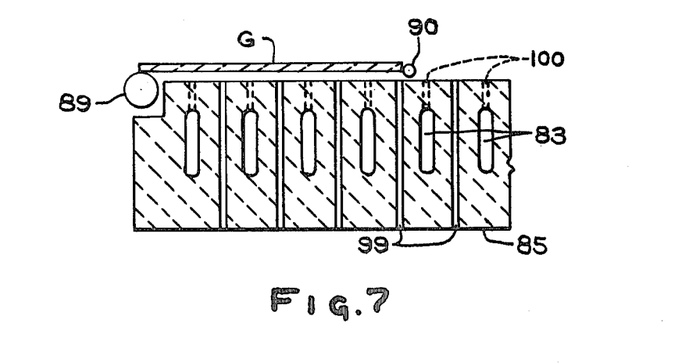
FIG. 7 is a cross-sectional view through the bending station of the preferred embodiment taken along lines 7—7 in FIG. 6.

When a glass sheet has arrived in the bending station, its forward progress is stopped in a predetermined orientation by a locator frame 90 resting on hearth block 85. The locator frame defines at least one contoured line of abutment against which the forward portion of the glass sheet may be received. As shown in FIG. 6, the locator frame 90 includes two lines of abutment for receiving two glass sheets G and G'. Each of the glass sheet contacting lines on the frame is contoured to correspond approximately to the outline of the leading portion of each glass sheet so that the glass sheet, when urged into engagement with the locator frame, will become seated firmly against the frame with little or no freedom of movement in the same manner described above in the previous embodiments. The locator frame 90 is spaced from the aligning roll 89 a precisely determined distance so that the trailing edge of a properly aligned glass sheet is approximately directly over the center of the aligning roll 33 as shown in FIG. 6. The frictional force between the aligning roll 89 and the glass sheets is minimized and restricted to the trailing edge of the glass sheet in order to avoid scuffing the glass, but is sufficient to drive the floating glass sheet into the fully abutted position against the locator frame and to retain the glass sheet in such position.

Figure 8:
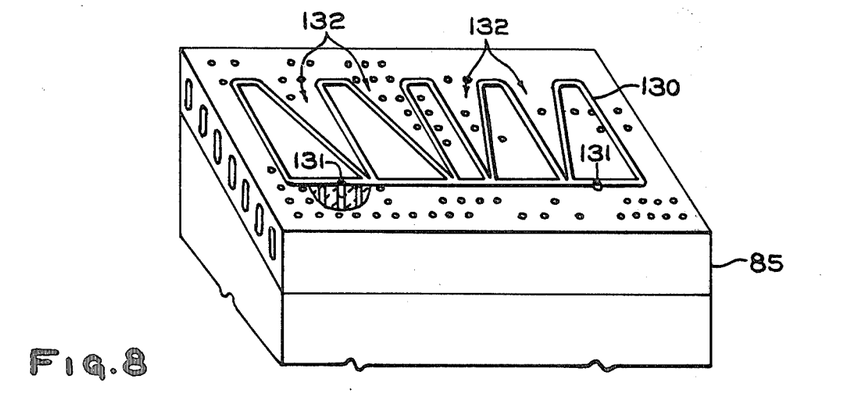
FIG. 8 is a perspective view of an alternate arrangement for the novel aligning which may be employed in the preferred embodiment of FIG. 5.

It should be apparent that a locator frame could be adapted to accommodate any number of glass sheets which will fit side-by-side on the hearth block 85. For example, a locator frame for receiving four glass sheets is depicted in FIG. 8 and will be described more fully below. The locator frame 90 may be held in place by means of laterally extending rods 97 which, as shown in FIG. 6, may be affixed to suitable support means on each side of the hearth block 85. The rods 97 preferably are fastened with some provision for adjustability, such as by clamping between a pair of plates 98 as shown. Other arrangements for mounting the locator frame will be described below in connection with FIGS. 8 and 9.

As shown in FIGS. 5 and 6, directly overlying the locator frame 90 is a flat vacuum platen 91. The vacuum platen is comprised of a hollow chamber having a flat bottom plate 92 through which a large number of perforations 93 extend. In order to protect the surface of the hot glass sheets, the underside of the vaccum platen may be covered with a protective cover 94, which may be a stretchable knit fiber glass fabric as disclosed in U.S. Pat. No. 3,148,968 to Cypher et al. The cover 94 may be held in place by a plurality of clamps 95. The hollow interior of the vacuum platen communicates with a source of vacuum by means of a flexible conduit 96. The area of the vacuum platen should exceed the total area of the largest glass sheet or sheets to be received at one time in the locator frame 90. For the greatest versatility, the vacuum platen may cover substantially the entire area of hearth block 85.

The flatness and rigidity of the bottom plate 92 of the vacuum platen are important factors for the successful practice of this preferred embodiment for bending glass sheets. Any significant deviation from flatness can result in distortion being imparted to the glass sheets. Thus, the bottom plate 92 should be fabricated with careful attention to providing a flat bottom surface and should be sufficiently rigid to avoid any bending or warping during use. Preferably, the bottom plate is a relatively thick single pieces of heat-resistant metal such as stainless steel, although in some cases it may be possible to use thinner stock material with reinforcement members welded to the interior surface. As an example of the preferred one-piece construction, a stainless steel thickness of at least ½ inch (13 millimeters), perferably at least ⅝ inch (16 millimeters), has been found suitable for a plate 32 inches by 78 inches (81 centimeters by 2 meters). In that example, the interior of the vacuum platen was 3 inches (7.5 centimeters) tall.

The vacuum platen 91 is provided with means for vertical reciprocation such as hydraulic cylinders 101 and guide rods 102 as shown in FIG. 5. The guide rods 102 may slide in fixed annular sleeves 103. The cylinders 101 reciprocate the vacuum platen between a raised position as shown in FIG. 1 and a lowered position in which the platen is brought into contact with or, preferably, closely adjacent to the locator frame 90 and the glass sheet or sheets held by the locator frame. When the vacuum platen is in the lowered position, sufficient vacuum is applied to draw the glass sheet into contact with the platen and to be lifted by the vacuum platen as the vacuum platen is raised. The platen need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass. Additionally, the amount of vacuum required, the number of perforations 93 in the vacuum platen, and the diameter of the perforations are interdependent. It is desirable to keep perforations 92 small in number and diameter so as to minimize the power requirement for maintaining a vacuum in the vacuum platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example, about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commerical composition.

With the glass sheet or sheets drawn against its underside by vacuum, the platen 91 is raised to the elevated position shown in FIG. 5 so as to leave sufficient clearance to insert an outline shaping mold 110 between the hearth block 85 and the platen. The shaping mold conforms to the outline and contour desired for the bent glass sheets and may preferably be constructed in accordance with the disclosure of U.S. Pat. No. 3,973,943 to S. L. Seymour, the disclosure of which is hereby incorporated by reference. The shaping mold 110 is preferably light in weight and notched along its upper edge in order to provide minimal interference with the flow of air during tempering. The shaping mold is carried on a shuttle 111 by which the shaping mold is translated horizontally through the bending, tempering, and unloading zones. In the specific embodiment illustrated, the shuttle consists of a pair of cantilevered beams 112 supported at one end by vertical braces 113, the upper ends of which are adapted to slide along a pair of horizontal guide rods 114. The means for driving the shuttle 111 along the horizontal path may be provided by way of an electric motor (not shown) driving a continuous chain 115, to which the upper ends of braces 113 are affixed. Cross-braces 116 may support the shaping mold or molds on the shuttle. In conjunction with the particular example shown in FIG. 6 where two sheets of glass are being processed simultaneously, there will, of course, be provided two corresponding shaping molds on the shuttle affixed side-by-side on the cross braces 116.

When the vacuum platen 91 has been raised to a height above the elevation of the shaping mold 110, the shuttle is driven to the left, as viewed in FIG. 5, so as to bring the bending mold into direct alignment beneath the sheet of glass elevated on the vacuum platen. Typically, the distance between the vacuum platen and the hearth block 85 at this point may be about 6 to 8 inches (15 to 20 centimeters). The uppermost extent of the shaping mold when in position directly beneath the glass sheet is spaced from the glass sheet a distance greater than the minimum required to clear the glass sheet so that when the glass sheet is released from the vacuum platen, it will fall freely a distance onto the shaping mold sufficient to generate a substantial bending force on the glass upon impact. A suitable distance between the platen and high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight, shape, and temperature of the glass and the degree of curvature to be imparted to the glass. Release of the glass sheet from the vacuum platen is carried out by opening a valve to bring the interior of the vacuum platen into communication with atmospheric pressure. The momentum imparted to the glass sheet by its free fall onto the shaping mold provides essentially the sole bending force for conforming the glass sheet to the contour of the shaping mold. Although some minor amount of sagging due to the force of gravity may take place after the glass sheet has come to rest on the shaping mold, preferably the majority of the bending is produced by the momentum-generated force. Sagging is a relatively slow process and in the preferred mode of operation, tempering is initiated in the minimum amount of time, thereby providing insufficient time for a significant amount of gravity-induced sagging to take place.

Upon receiving the glass sheet, the shaping mold is immediately transferred out of the bending station into the tempering station 72. The tempering station includes upper and lower blast heads 120 and 121 which direct blasts of tempering medium (usually air) onto opposite sides of the glass sheet so as to rapidly cool surface portions of each glass sheet, thereby imparting a temper to the glass sheet. In the type of tempering station shown in FIG. 5, each blast head includes a plurality of pipe modules 122 in fluid communication at their ends with a manifold 123 or 124. Each manifold, in turn, is supplied with pressurized tempering fluid through ducts 125 and 126. Each of the pipe modules 122 has a plurality of small orifices oriented so as to direct jets of tempering fluid toward the position occupied by glass sheets supported in the space between the upper and lower blast heads 120 and 121. The pipe modules 122 may be provided with adjustability in the vertical direction with respect to the manifolds 123 and 124 so that more uniform spacing between the glass surfaces and the pipe modules may be provided. The lower blast head 121 may be provided with hinged support 127 at one end and cylinder means 128 at the opposite end so as to permit the lower quench module to be tilted when the need arises to clear glass fragments from the blast head. While blasts of tempering medium are being directed onto the glass sheets in the tempering station, it is preferred to provide relative motion between the blast heads and the glass sheets. This may be carried out by horizontally reciprocating the shuttle means 111 on which the shaping molds and the glass sheets are carried.

When tempering has been completed, the shuttle means 111 advances to the full right-hand position as shown in FIG. 5 to bring the glass sheet or sheets into the unloading station 73. There, the glass sheets may be removed from the shaping molds by hand or by suitable mechanical means.

The following parameters relate to an example of a successful operation of the above-described preferred embodiment of FIGS. 5 and 6 operating on glass sheets 3 millimeters thick. It should be understood that under different conditions there parameters will vary. The furnace atmosphere was maintained at a temperature of about 1300° F. (700° C.). The gas issuing from the hearth block 85 in the bending zone may be about 1100° to 1350° F. (600° C. to 725° C.), typically about 1250° F. (675° C.). The vacuum platen 91 attained a temperature of about 500° to 750° F. (260° to 400° C.) after a period of operation due to its proximity to the hot gases from hearth block 25. The glass was typically at about 1210° F. (650° C.) when picked up by the vacuum platen. A total of about 6 seconds elapsed from the time of glass pick-up until the initiation of tempering, at which time the glass had cooled to about 1190° F. (640° C.). About 3 seconds elapsed from the time the glass was dropped onto the shaping mold until tempering was initiated. Altogether about 10 seconds was required for the glass to pass from the furnace exit, to undergo bending, and to enter the tempering station.

FIG. 8 shows an alternate arrangement for mounting a locator frame onto the hearth block 85 in the bending station. To illustrate the versatility of the locator frame arrangement, a locator frame 130 is depicted in FIG. 8, which is provided with four pockets 132 permitting the simultaneous alignment and bending of four sheets of glass. To retain the locator frame in place, two or more pins 131 are welded to the front edge of the locator frame and may be inserted into holes bored into the hearth block 85. The holes may be those already present in the hearth block for the passage of gases, or special holes may be drilled for the purpose of receiving the pins 131.

Figure 9:
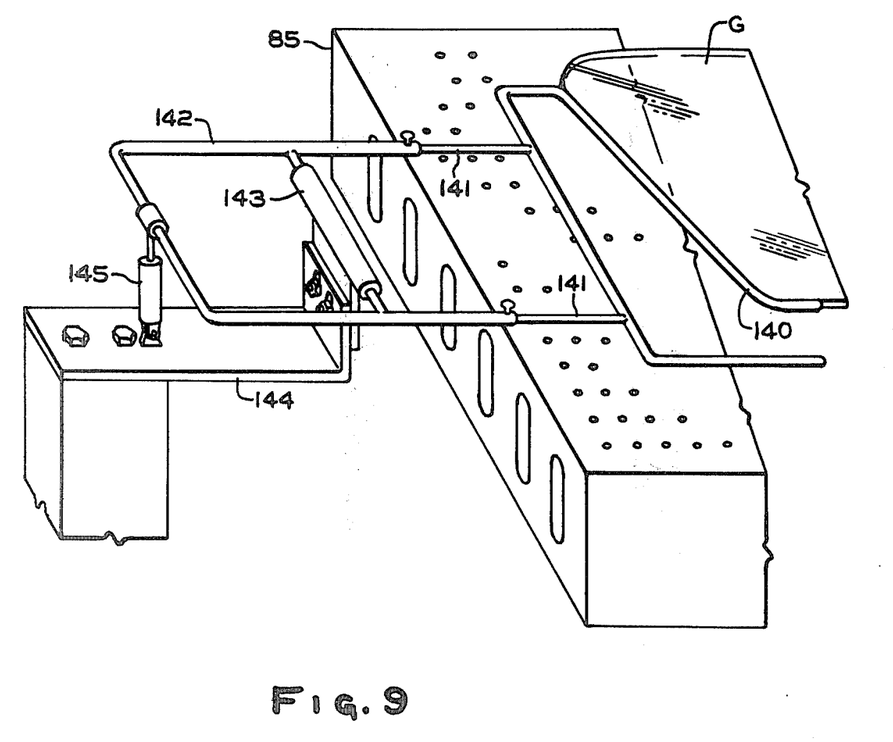
FIG. 9 is a perspective view showing details of a preferred mounting arrangement for the aligning means in the preferred embodiment of FIG. 5.

FIG. 9 depicts yet another variation on the mounting arrangement for the locator frame. In this case, the locator frame is provided with pivoting support so that the locator frame may be readily raised above the surface of the hearth block 85 if it should become necessary to remove glass fragments from the hearth block. A pair of rods 141 telescope into the ends of a tubular hinge bracket 142 for lateral adjustability. The hinge bracket 142 pivots through a sleeve 143 which is affixed with vertical adjustability to a support arm 144. The outer end of hinge bracket 142 may be engaged by mechanical actuating means, such as a hydraulic cylinder 145, so as to provide remote control of the locator frame lifting mechanism. In the embodiment of FIG. 9, it is preferred that the locator frame consist of two halves with each half being lifted by its own respective hinge means.

Descriptions of specific embodiments have been set forth herein for the sake of illustrating the best mode and other illustrative examples for practicing applicant's invention, but it should be understood that other variations and modifications as are known to those of skill in the art may be resorted to without departing from the spirit and scope of the invention as set forth in the claims which follow.

I claim:

1. In a method of bending glass sheets of the type wherein each glass sheet is heated to a softened condition and then conveyed into a bending station where it is stopped in a substantially horizontal position and brought into contact with bending means which impart the desired curvature to the glass sheet; the improvement comprising accurately aligning the glass sheet with the bending means by urging the glass sheet in a forward horizontal direction to bring forward portions of the glass sheet having a curved outline into edgewise abutment with at least a portion of an elongated, contoured line of abutment formed by a horizontally extending, rigid frame and conforming to the curved outline of the foward portions of the glass sheet along a sufficient extent of the perimeter of the glass sheet to define a single fixed location and orientation for the glass sheet, and continuing to urge the glass sheet toward said line of abutment after initial contact therebetween by means of a rotating roll contacting a rear edge portion of the glass sheet opposite said forward portions so as to force the forward edge portions of the glass sheet to come into contact with the corresponding portions of said line of abutment and to be guided thereby into the single fixed location and orientation defined by the line of abutment.

2. The method of claim 1 wherein the glass sheets are supported on a layer of hot gases as they are conveyed into the bending station and aligned.

3. The method of claim 1 wherein the glass sheets are conveyed into the bending station by means of a roller conveyor and are supported by a roller conveyor section within the bending zone during alignment.

4. The method of claim 3 wherein said roller conveyor section within the bending zone ceases to be driven when contact is made between a glass sheet and said line of abutment.

5. The method of claim 2 or 3 wherein the rotating roll continues to rotate in contact with the lower corner of the rear edge of the glass sheet after forward portions of the glass sheet have come into full contact with the line of abutment.

6. The method of claim 1, 2 or 3 wherein a plurality of glass sheets are conveyed into a bending station side-by-side and brought into alignment simultaneously by means of the rotating roll urging the glass sheets into contact with a corresponding plurality of lines of abutment formed by said frame.

7. The method of claim 1 wherein the glass sheet is skewed out of alignment with the bending means as it enters the bending station and the urging of the glass sheet into contact with the line of abutment produces a rotation of the glass sheet into the proper alignment.

8. In an apparatus for horizontally bending glass sheets comprising means for heating glass sheets, a bending station including bending means for engaging a substantially horizontally disposed heat-softened glass sheet and imparting a predetermined curvature thereto, and conveyor means for carrying glass sheets from the heating means into the bending station and supporting the glass sheets in a substantially horizontal position within the bending station; the improvement comprising a horizontally extending, rigidly supported frame over said conveyor means within the bending station, said frame presenting an elongated, curved line of abutment to forward edge portions of a glass sheet entering the bending station, the line of abutment being curved to conform to the outlines of corresponding curved forward edge portions of the glass sheet along a sufficient extent of the perimeter of the glass sheet to define a single fixed location and orientation for the glass sheet, and a driven roll spaced from the line of abutment a distance approximately equal to the length of the glass sheet and mounted at an elevation and orientation so as to contact rear edge portions of the glass sheet opposite said forward edge portions and force the glass sheet into contact with the line of abutment, whereby the glass sheet may be provided with accurate, predetermined alignment within the bending station.

9. The apparatus of claim 8 wherein the portion of the conveyor means within the bending station comprises a flat, perforated bed adapted to support a glass sheet on a layer of hot gases.

10. The apparatus of claim 8 wherein said conveyor means comprises a flat, perforated bed extending through a heating means and into the bending station adapted to support glass sheets on a layer of hot gases.

11. The apparatus of claim 8 wherein said conveyor means comprises a roller conveyor extending through said heating means and into the bending station.

12. The apparatus of claim 11 wherein said driven aligning roll is provided with drive means independent from the drive means for the roller conveyor.

13. The apparatus of claim 9 wherein said frame rests on the flat gas support bed within the bending station.

14. The apparatus of claim 8 wherein said frame includes a plurality of lines of abutment arranged side-by-side so as to receive and align a plurality of glass sheets simultaneously.

15. The apparatus of claim 8 wherein said line of abutment is discontinuous.

16. The apparatus of claim 8 wherein said frame is affixed to means for raising the frame above the level of glass support in the bending station.

17. The apparatus of claim 8 wherein the frame is comprised of two separate sections, each being affixed to respective pivot means on opposite sides of the bending station for pivoting the frame sections above the level of glass support in the bending station.

18. In a method of bending glass sheets of the type wherein each glass sheet is heated to a softened condition and then conveyed into a bending station where it is stopped in a substantially horizontal position and brought into contact with bending means which impart the desired curvature to the glass sheet; the improvement comprising accurately aligning the glass sheet with the bending means by urging the glass sheet in a forward horizontal direction to bring forward portions of the glass sheet having forwardly converging side edge portions into edgewise abutment with at least a portion of an elongated, contoured line of abutment formed by a horizontally extending, rigid frame and conforming to the outline of the forward portions of the glass sheet along a sufficient extent of the converging side edge portions of the glass sheet to define a single fixed location and orientation for the glass sheet, and continuing to urge the glass sheet toward said line of abutment after intial contact therebetween by means of a rotating roll contacting a rear edge portion of the glass sheet opposite said forward portions so as to force the forward edge portions of the glass sheet to come into contact with the corresponding portions of said line of abutment and to be guided thereby into the single fixed location and orientation defined by the line of abutment.

19. The method of claim 18 wherein the glass sheets are supported on a layer of hot gases as they are conveyed into the bending station and aligned.

20. The method of claim 18 wherein the glass sheets are conveyed into the bending station by means of a roller conveyor and are supported by a roller conveyor section within the bending zone during alignment.

21. The method of claim 20 wherein said roller conveyor section within the bending zone ceases to be driven when contact is made between a glass sheet and said line of abutment.

22. The method of claim 19 or 20 wherein the rotating roll continues to rotate in contact with the lower corner of the rear edge of the glass sheet after forward portions of the glass sheet have come into full contact with the line of abutment.

23. The method of claim 18, 19 or 20 wherein a plurality of glass sheets are conveyed into a bending station side-by-side and brought into alignment simultaneously by means of the rotating roll urging the glass sheets into contact with a corresponding plurality of lines of abutment formed by said frame.

24. The method of claim 18 wherein the glass sheet is skewed out of alignment with the bending means as it enters the bending station and the urging of the sheet into contact with the line of abutment produces a rotation of the glass sheet into the proper alignment.

25. In an apparatus for horizontally bending glass sheets comprising means for heating glass sheets, a bending station including bending means for engaging a substantially horizontally disposed heat-softened glass sheet and imparting a predetermined curvature thereto, and conveyor means for carrying glass sheets from the heating means into the bending station and supporting the glass sheets in a substantially horizontal position within the bending station; the improvement comprising a horizontally extending, rigidly supported frame over said conveyor means within the bending station, said frame presenting an elongated line of abutment to forward edge portions of a glass sheet entering the bending station, the line of abutment conforming to the outlines of forward edge portions of the glass sheet along a sufficient extent of the perimeter of the glass sheet to define a single fixed location and orientation for the glass sheet, at least a portion of the line of abutment extending obliquely to the direction of glass travel, and a driven roll spaced from the line of abutment a distance approximately equal to the length of the glass sheet and mounted at an elevation and orientation so as to contact rear edge portions of the glass sheet opposite said forward edge portions and force the glass sheet into contact with the line of abutment, whereby the glass sheet may be provided with accurate, predetermined alignment within the bending station.

26. The apparatus of claim 25 wherein the portion of the conveyor means within the bending station comprises a flat, perforated bed adapted to support a glass sheet on a layer of hot gases.

27. The apparatus of claim 25 wherein said conveyor means comprises a flat, perforated bed extending through a heating means and into the bending station adapted to support glass sheets on a layer of hot gases.

28. The apparatus of claim 25 wherein said conveyor means comprises a roller conveyor extending through said heating means and into the bending station.

29. The apparatus of claim 28 wherein said driven aligning roll is provided with drive means independent from the drive means for the roller conveyor.

30. The apparatus of claim 26 wherein said frame rests on the flat gas support bed within the bending station.

31. The apparatus of claim 25 wherein said frame includes a plurality of lines of abutment arranged side-by-side so as to receive and align a plurality of glass sheets simultaneously.

32. The apparatus of claim 25 wherein said line of abutment is discontinuous.

33. The apparatus of claim 25 wherein said frame is affixed to means for raising the frame above the level of glass support in the bending station.

34. The apparatus of claim 25 wherein the frame is comprised of two separate sections, each being affixed to respective pivot means on opposite sides of the bending station for pivoting the frame sections above the level of glass support in the bending station.

* * * * *